(12) United States Patent
Oh et al.

(10) Patent No.: US 10,391,831 B2
(45) Date of Patent: Aug. 27, 2019

(54) COMBINED HEAT EXCHANGER MODULE

(71) Applicant: Hyundai Motor Company, Seoul (KR)

(72) Inventors: Man Ju Oh, Yongin-si (KR); Jae Woo Park, Ansan-si (KR); Jae Woong Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 479 days.

(21) Appl. No.: 14/944,014

(22) Filed: Nov. 17, 2015

(65) Prior Publication Data
US 2017/0021697 A1    Jan. 26, 2017

(30) Foreign Application Priority Data

Jul. 23, 2015    (KR) .......................... 10-2015-0104571

(51) Int. Cl.
| | |
|---|---|
| *B60H 1/00* | (2006.01) |
| *F28F 9/16* | (2006.01) |
| *F28D 1/04* | (2006.01) |
| *F28D 1/053* | (2006.01) |
| *F25B 39/02* | (2006.01) |

(52) U.S. Cl.
CPC ....... *B60H 1/00335* (2013.01); *F28D 1/0435* (2013.01); *F28D 1/05383* (2013.01); *F28F 9/165* (2013.01); *F25B 39/02* (2013.01); *F28F 2230/00* (2013.01)

(58) Field of Classification Search
CPC .. B60H 1/00335; F28F 9/165; F28F 2230/00; F28D 1/05383; F28D 1/0435; F25B 39/02
See application file for complete search history.

(56) References Cited

U.S. PATENT DOCUMENTS

| | | | | |
|---|---|---|---|---|
| 3,116,167 A | * | 12/1963 | Talaat ..................... | H01L 35/30 136/210 |
| 4,242,874 A | * | 1/1981 | Simms ..................... | F25B 21/02 62/3.6 |
| 5,737,923 A | * | 4/1998 | Gilley ..................... | F25B 21/02 165/104.26 |

(Continued)

FOREIGN PATENT DOCUMENTS

| | | |
|---|---|---|
| JP | 6-6976 U | 1/1994 |
| JP | 2012-96695 A | 5/2012 |

(Continued)

*Primary Examiner* — Ljiljana V. Ciric
(74) *Attorney, Agent, or Firm* — Morgan, Lewis & Bockius LLP

(57) ABSTRACT

A combined heat exchanger module includes an upper tank configured to introduce cooling water into the combined heat exchanger module; a lower tank configured to discharge the cooling water from the combined heat exchanger module; first heat radiating channels, each having an upper end connected with the upper tank and a lower end connected with the lower tank; second heat radiating channels, each having an upper end connected with the upper tank and a lower end connected with the lower tank; and thermoelectric elements, each having a first surface in surface contact with the second heat radiating channels and a second surface exposed to air, whereby heat generated from an engine or electric components of a vehicle is absorbed in the cooling water.

5 Claims, 5 Drawing Sheets

(56) References Cited

U.S. PATENT DOCUMENTS

| | | | | |
|---|---|---|---|---|
| 5,884,486 A * | 3/1999 | Hughes | F25B 21/02 | 62/279 |
| 9,829,220 B2 * | 11/2017 | Oh | B23P 15/26 | |
| 9,897,383 B2 * | 2/2018 | Yesin | F28D 1/05383 | |
| 10,260,781 B2 * | 4/2019 | Lin | F25B 21/02 | |
| 2002/0148235 A1 * | 10/2002 | Bell | F02G 1/043 | 62/3.3 |
| 2007/0045044 A1 * | 3/2007 | Sullivan | F01N 1/02 | 181/268 |
| 2008/0028769 A1 * | 2/2008 | Goenka | B60H 1/00328 | 62/3.7 |
| 2008/0066874 A1 * | 3/2008 | Bhatti | B01D 1/14 | 159/5 |
| 2008/0078202 A1 * | 4/2008 | Luo | F25B 21/02 | 62/485 |
| 2008/0105413 A1 * | 5/2008 | Peng | F28F 3/048 | 165/104.33 |
| 2009/0056916 A1 * | 3/2009 | Yesin | F28D 1/05383 | 165/104.21 |
| 2009/0266104 A1 * | 10/2009 | Ichiyanagi | F25B 39/00 | 62/498 |
| 2012/0073309 A1 * | 3/2012 | Hung | F25B 21/02 | 62/3.3 |
| 2012/0102974 A1 * | 5/2012 | Kawazoe | B60H 1/00035 | 62/3.61 |
| 2013/0306285 A1 * | 11/2013 | Jindou | F25B 39/00 | 165/173 |
| 2014/0137569 A1 * | 5/2014 | Parish | F25B 21/02 | 62/3.2 |
| 2015/0059360 A1 * | 3/2015 | Lin | F25B 21/02 | 62/3.2 |
| 2015/0176871 A1 * | 6/2015 | Oh | B23P 15/26 | 62/3.3 |
| 2016/0195313 A1 * | 7/2016 | Finkleman | F24F 5/0007 | 62/3.3 |
| 2018/0058732 A1 * | 3/2018 | Oh | F28D 1/05383 | |
| 2019/0003786 A1 * | 1/2019 | Birkett | F28F 9/26 | |

FOREIGN PATENT DOCUMENTS

| | | | | |
|---|---|---|---|---|
| KR | 20-1998-0047782 U | | 9/1998 | |
| KR | 20090005728 A | * | 1/2009 | |
| KR | 20090005728 U | * | 6/2009 | |
| KR | 10-2009-0080184 A | | 7/2009 | |
| KR | 10-2013-0073042 A | | 7/2013 | |
| KR | 10-1373564 B1 | | 3/2014 | |
| KR | 20150081192 A | * | 7/2015 | ........ H04M 3/42068 |
| WO | WO 1997/022486 A1 | | 6/1997 | |

* cited by examiner

COMBINED HEAT EXCHANGER MODULE

CROSS-REFERENCE TO RELATED APPLICATION

The present application claims priority to Korean Patent Application No. 10-2015-0104571, filed Jul. 23, 2015, the entire contents of which is incorporated herein for all purposes by this reference.

BACKGROUND OF THE INVENTION

Field of the Invention

The present invention relates to a combined heat exchanger module, and more particularly to a combined heat exchanger module capable of rapidly supplying warm air to an indoor space by supplementing an insufficient heat source during a heating operation.

Description of Related Art

In general, an air-conditioning system for an automobile serves to provide a pleasant environment for occupants in the car by controlling the indoor temperature for their comfort or to remove frost and condensation generated on a window of the car so that a driver can secure clear vision and safe driving can be ensured.

The air-conditioning system includes a cooling system and a heating system in order to control the indoor temperature to a desired temperature. The cooling system includes an evaporator core mounted in a refrigerant line, and is operated such that cooled refrigerant flows through the evaporator core and external air passes by the evaporator core so as to cause heat exchange between the refrigerant in the evaporator core and the external air, thereby cooling the air to be supplied to the indoor space.

The heating system includes a heater core mounted in a cooling water line, and is operated such that hot cooling water flows through the heater core and external air passes by the heater core so as to cause heat exchange between the cooling water in the heater core and the external air, thereby heating the air to be supplied to the indoor space.

Heat generated from an engine during the operation of the same is absorbed in cooling water, or heat generated by electronic components of electric vehicles or hybrid vehicles is absorbed and supplied to the heater core. However, when the engine is initially started, the temperature of the cooling water is not adequate to heat the indoor space because the engine is not generating sufficient heat. Meanwhile, the heat generated by the electronic components of electric vehicles or hybrid vehicles is typically insufficient to heat the indoor space.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a combined heat exchanger module capable of rapidly heating air using thermoelectric elements added to a heater core.

According to various aspects of the present invention, a combined heat exchanger module may include an upper tank into which cooling water is introduced, a lower tank from which the cooling water is discharged, first heat radiating channels, each having an upper end connected with the upper tank and a lower end connected with the lower tank, the first heat radiating channels being formed with a plate tube shape through which the cooling water flows and being arranged in planes which are parallel to a direction of air flow, second heat radiating channels, each having an upper end connected with the upper tank and a lower end connected with the lower tank, the second heat radiating channels being formed with a plate tube shape through which the cooling water flows and being arranged in planes which are parallel to the direction of the air flow and are disposed upstream or downstream of the first heat radiating channels with respect to the direction of the air flow, and thermoelectric elements, each having a first surface in surface contact with the second heat radiating channels and a second surface exposed to air.

The combined heat exchanger module may further include heat radiation fins coupled to at least one of the first heat radiating channels and the second surface of the thermoelectric elements, in which the heat radiation fins are exposed to air.

The combined heat exchanger module may further include gaskets provided to seal connection portions between the upper and lower tanks and the first and second heat radiating channels.

The thermoelectric elements may be coupled to both lateral surfaces of the second heat radiating channels by surface-contacting.

The thermoelectric elements may be arranged in series and may be connected to each other.

The first surface of each of the thermoelectric elements that is in surface contact with the second heat radiating channels may act as a cooling surface.

According to various aspects of the present invention, a combined heat exchanger module may include a first upper tank into which cooling water is introduced, a lower tank into which the cooling water is introduced or from which the cooling water is discharged, a second upper tank from which the cooling water is discharged, first heat radiating channels, each having an upper end connected with the first upper tank and a lower end connected with the lower tank, the first heat radiating channels being formed with a plate tube shape through which the cooling water flows and being arranged in planes which are parallel to the direction of air flow, second heat radiating channels, each having a lower end connected with the lower tank and an upper end connected with the second upper tank, the second heat radiating channels being formed with a plate tube shape through which the cooling water flows and being arranged in planes which are parallel to the direction of the air flow and are disposed upstream or downstream of the first heat radiating channels with respect to the direction of the air flow, and thermoelectric elements, each having a first surface which is in surface contact with the second heat radiating channels and a second surface exposed to air.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
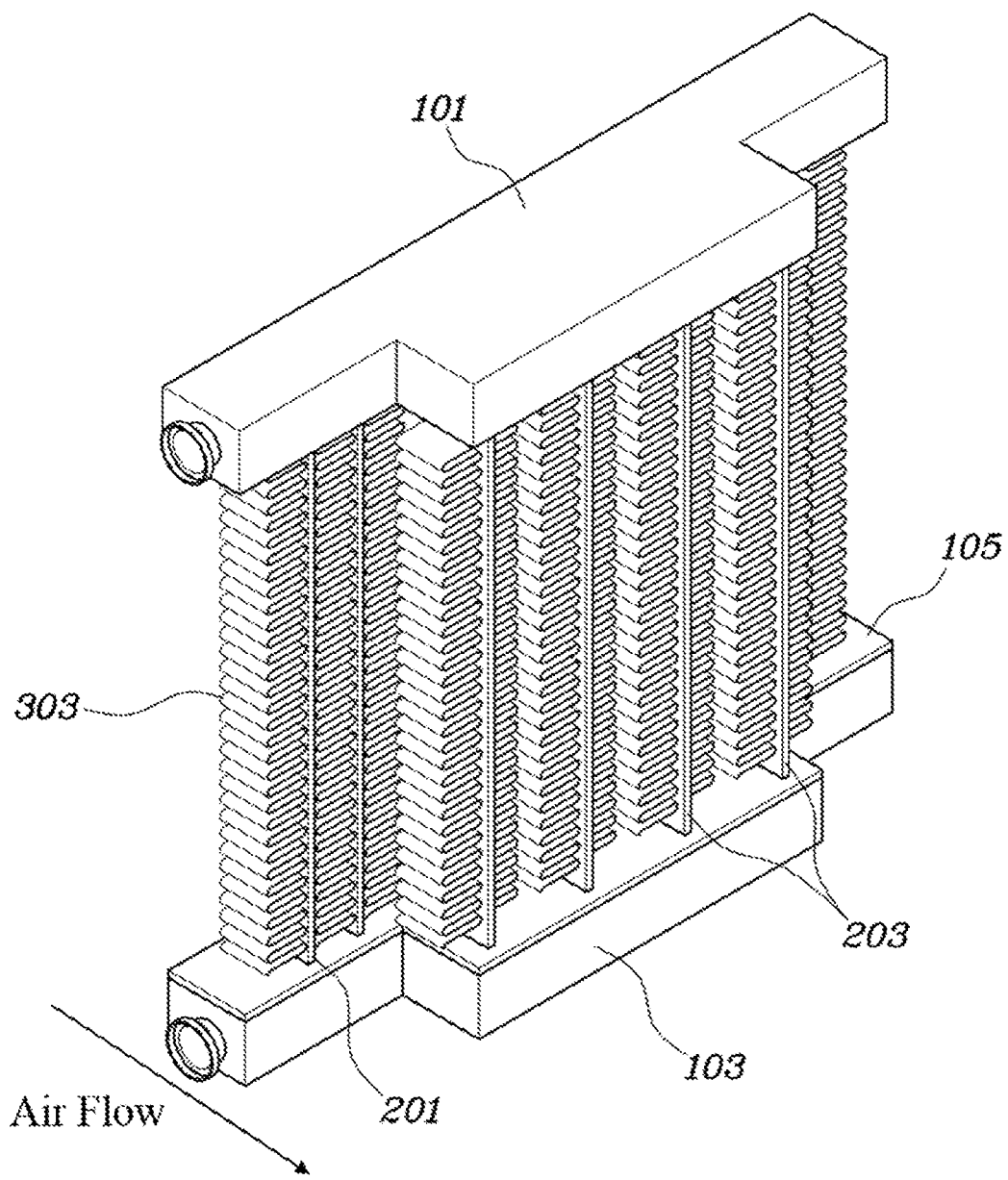
FIG. 1 is a perspective view of an exemplary combined heat exchanger module according to the present invention.
Figure 2:
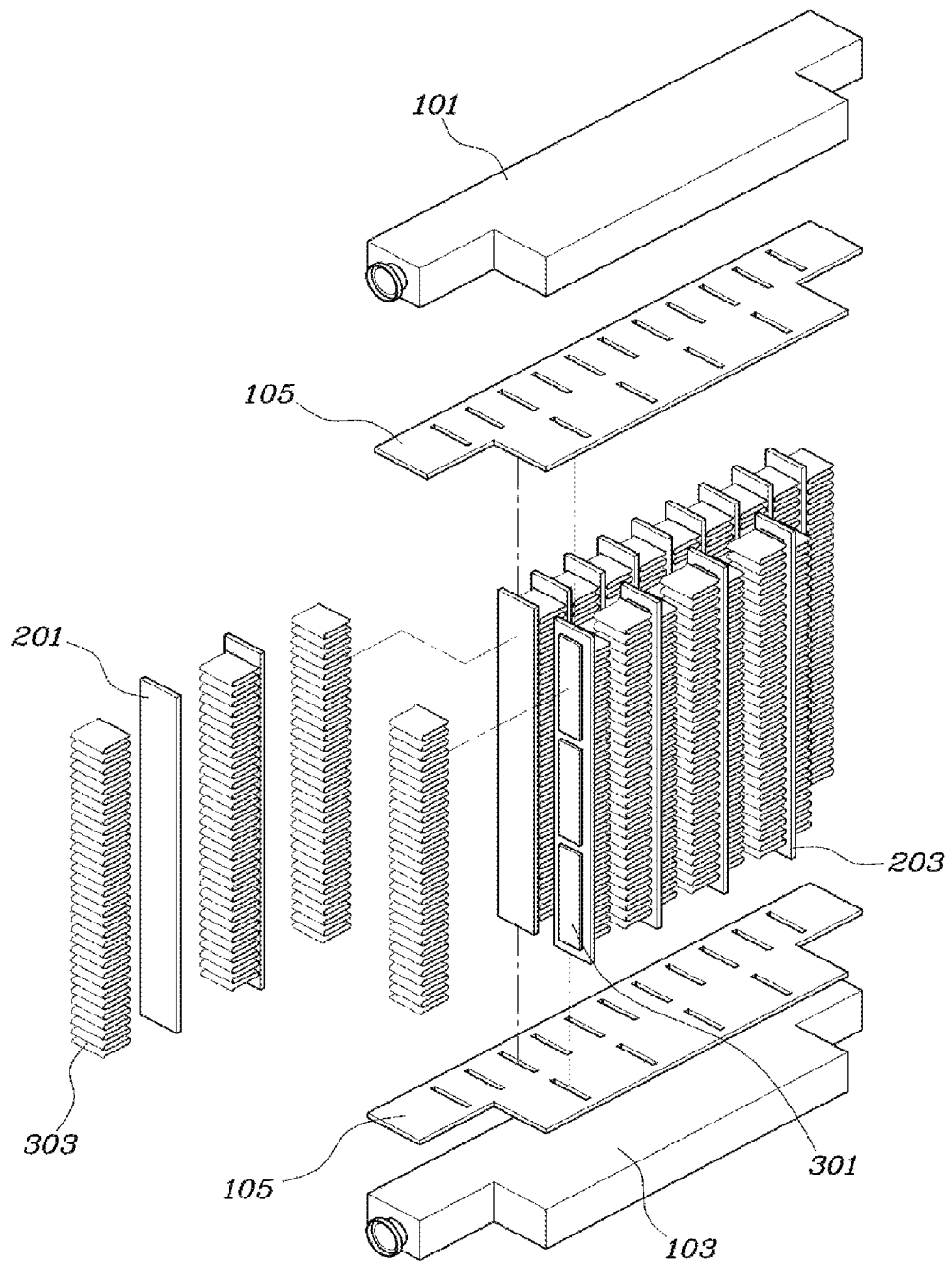
FIG. 2 is an exploded perspective view of the exemplary combined heat exchanger module according to the present invention.
Figure 3:
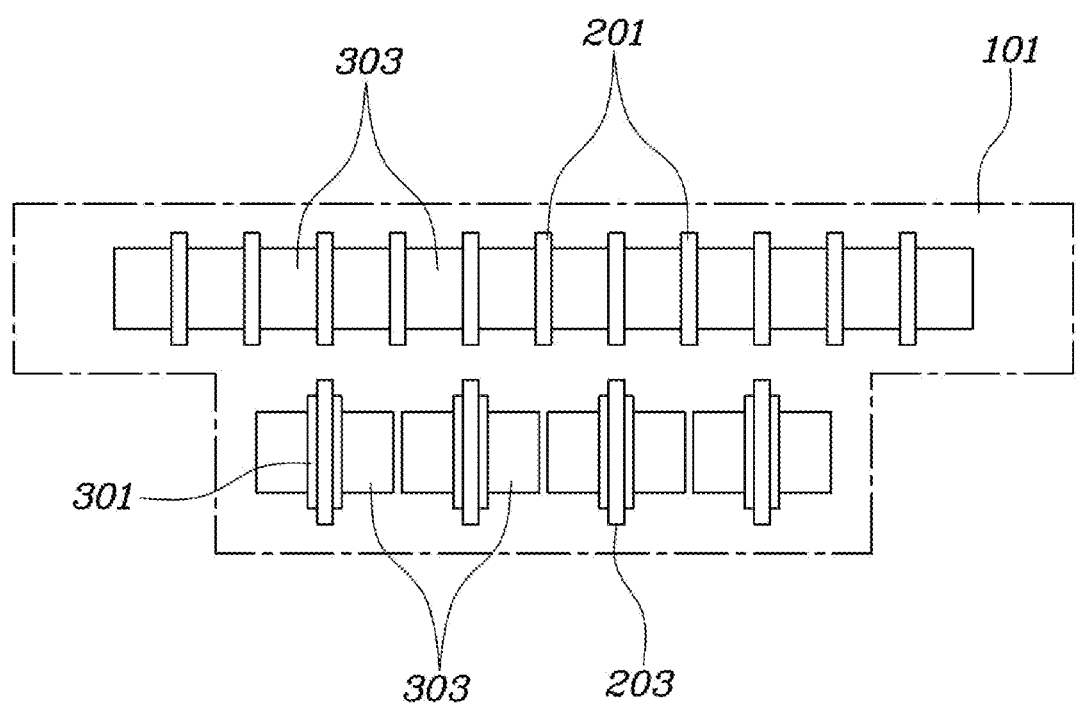
FIG. 3 is a plan view of the exemplary combined heat exchanger module according to the present invention.
Figure 4:
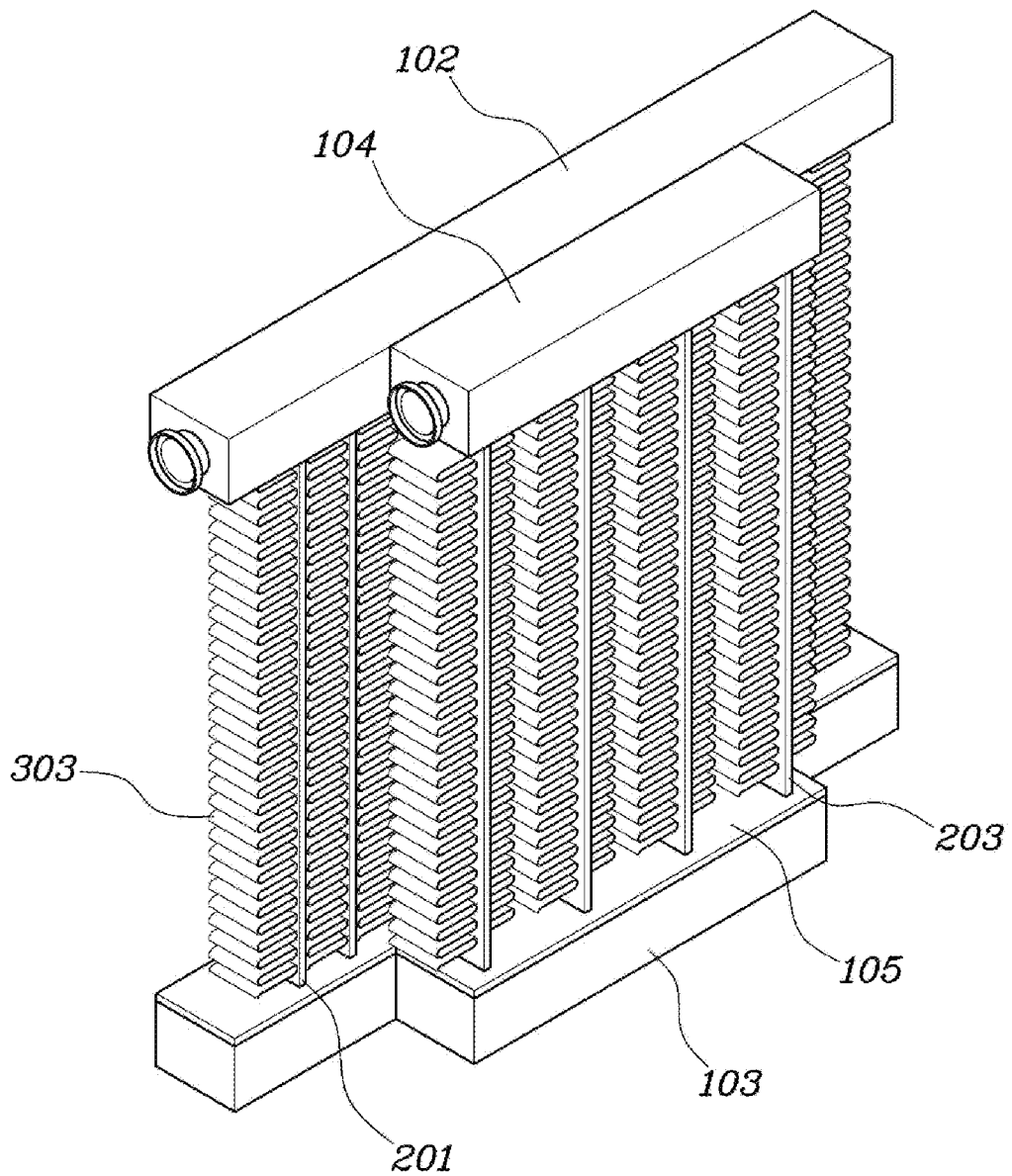
FIG. 4 is a perspective view of an exemplary combined heat exchanger module according to the present invention.
Figure 5:
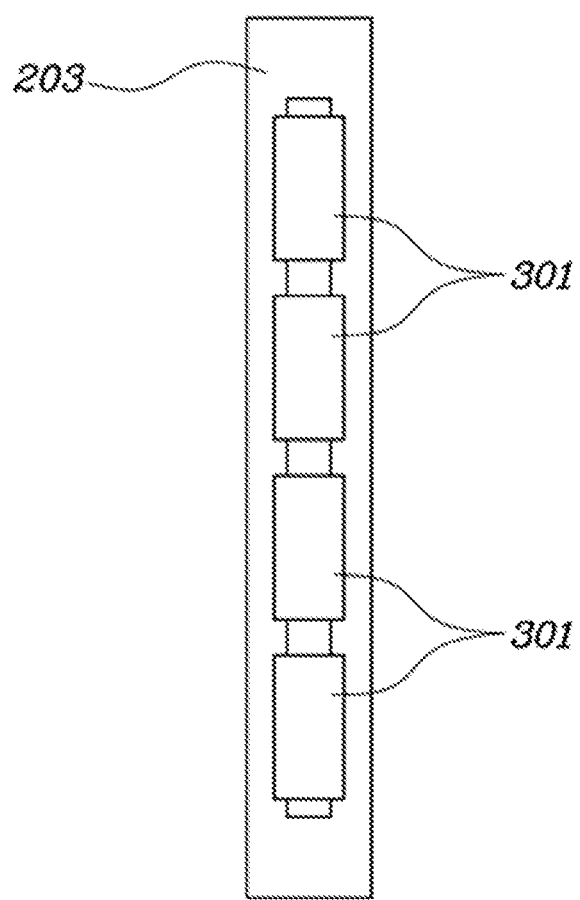
FIG. 5 is a view of thermoelectric elements of the exemplary combined heat exchanger module according to the present invention.

FIG. 1 is a perspective view of a combined heat exchanger module according to various embodiments of the present invention, FIG. 2 is an exploded perspective view of the combined heat exchanger module according to various embodiments of the present invention, FIG. 3 is a plan view of the combined heat exchanger module according to various embodiments of the present invention, FIG. 4 is a perspective view of a combined heat exchanger module according to various embodiments of the present invention, and FIG. 5 is a view of thermoelectric elements of the combined heat exchanger module according to various embodiments of the present invention.

A combined heat exchanger module according to various embodiments of the present invention includes an upper tank 101 into which cooling water is introduced, a lower tank 103 from which the cooling water is discharged, first heat radiating channels 201, each having an upper end connected with the upper tank 101 and a lower end connected with the lower tank 103, the first heat radiating channels 201 being formed to have a plate tube shape through which the cooling water flows and being arranged in planes which are parallel to the direction of air flow, second heat radiating channels 203, each having an upper end connected with the upper tank 101 and a lower end connected with the lower tank 103, the second heat radiating channels 203 being formed to have a plate tube shape through which the cooling water flows and being arranged in planes which are parallel to the direction of the air flow and are disposed upstream or downstream of the first heat radiating channels 201 with respect to the direction of the air flow, and thermoelectric elements 301, each having one surface which is in surface contact with the second heat radiating channels 203 and the other surface exposed to air.

Referring to FIGS. 1 and 2, the cooling water is introduced into the upper tank 101, and is discharged from the lower tank 103. The upper end of each of the first heat radiating channels 201 is connected with the upper tank 101, and the lower end of each of the first heat radiating channels 201 is connected with the lower tank 103. The first heat radiating channels 201 are formed to have a plate tube shape through which the cooling water flows, and are arranged in planes which are parallel to the direction of the air flow. The upper end of each of the second heat radiating channels 203 is connected with the upper tank 101, and the lower end of each of the second heat radiating channels 203 is connected with the lower tank 103. The second heat radiating channels 203 are formed to have a plate tube shape through which the cooling water flows, and are arranged in planes which are parallel to the direction of the air flow and are disposed upstream or downstream of the first heat radiating channels 201 with respect to the direction of the air flow. One surface of each of the thermoelectric elements 301 is in surface contact with the second heat radiating channels 203, and the other surface of each of the thermoelectric elements 301 is exposed to the air.

Vehicles are basically equipped with an air conditioning system for cooling or heating air in an indoor space in order to maintain a pleasant indoor environment. During the heating operation, indoor air is heated through heat exchange using a heater core. Heat generated from the engine during the operation of the same is absorbed in cooling water, or heat generated by electronic components of electric vehicles or hybrid vehicles is absorbed and supplied to the heater core. However, when the engine is initially started, the temperature of the cooling water is not adequate to heat the indoor space because the engine is not generating sufficient heat. Meanwhile, the heat generated by the electronic components of electric vehicles or hybrid vehicles is typically insufficient to heat the indoor space.

Describing the combined heat exchanger module according to the present invention in detail, the air to be supplied to the indoor space is mainly heated by the first heat radiating channels 201, through which the cooling water flows, and is secondarily heated by the thermoelectric elements 301 that are in surface contact with the second heat radiating channels 203. Accordingly, even when the temperature of the heat source for the heating operation is relatively low, warm air can be supplied to the indoor space in a short time as compared to the prior art.

Referring to FIG. 3, it is important to raise the temperature of one surface of the thermoelectric elements 301 in order to generate sufficient heat for the heating operation from the other surface of the thermoelectric elements 301. The combined heat exchanger module according to the present invention can be more efficiently operated by raising the temperature of one surface of the thermoelectric elements 301 using the thermal energy of the cooling water supplied to the second heat radiating channels 203 with which one surface of the thermoelectric elements 301 is in surface contact. Further, since the cooling water is cooled more using a cooling surface of the thermoelectric elements 301 than when using an air-cooling method, the cooling water can efficiently cool the engine or electronic components.

Furthermore, since the second heat radiating channels 203 are disposed upstream or downstream of the first heat radiating channels 201, it is possible to determine which of the first heat radiating channels 201 and the second heat radiating channels 203 the air to be supplied to the indoor space undergoes first heat exchange with.

In addition, since the first heat radiating channels 201, acting as a heater core, and the second heat radiating channels 203, acting to heat air using the thermoelectric elements 301, are combined in a single module, the combined heat exchanger module according to the present invention takes up less space.

Heat radiation fins 303 may be coupled to the first heat radiating channels 201 and/or the other surface of the thermoelectric elements 301, and may be exposed to the air.

As shown in FIGS. 1 and 2, the heat radiation fins 303, which are coupled to the first heat radiating channels 201 and/or the other surface of the thermoelectric elements 301 and are exposed to the air, serve to increase the area for heat exchange with the air to be supplied to the indoor space, thereby heating the air more rapidly.

Gaskets 105 may be provided to seal connection portions between the upper/lower tanks 101 and 103 and the first/second heat radiating channels 201 and 203.

Referring to FIG. 2, because the volume of materials is frequently changed due to changes in the temperature in the cooling water circulation line for heating, water leaks may occur unless the seal is ensured, which may cause overheating of the engine or electronic components due to a lack of cooling water, or may cause damage or malfunction of the electronic components. Therefore, the seal is considerably important. For this reason, the gaskets 105 are provided at the connection portions between the upper/lower tanks 101 and 103 and the first/second heat radiating channels 201 and 203 in order to prevent the leakage of the cooling water.

The thermoelectric elements 301 may be coupled to both lateral surfaces of the second heat radiating channels 203 in a surface-contact manner.

As shown in FIG. 3, since the thermoelectric elements 301 are in surface contact with both lateral surfaces of the second heat radiating channels 203, the air to be supplied to the indoor space can be heated in a shorter time, and the temperature of the cooling water can be lowered in a shorter time, thereby effectively cooling the engine or electronic components.

As shown in FIG. 5, a plurality of thermoelectric elements 301 may be arranged in series and connected to each other.

If the thermoelectric elements 301 are manufactured to have a size corresponding to the second heat radiating channels 203, manufacturing costs may be increased. Even worse, the larger the area of the thermoelectric elements 301 that is to be made to contact the second heat radiating channels 203, the harder it is to maintain the flatness of the thermoelectric elements 301. Thus, it becomes difficult to make the thermoelectric elements 301 and the second heat radiating channels 203 closely contact each other. If the surface contact between the thermoelectric elements 301 and the second heat radiating channels 203 is not perfectly achieved, heat exchange therebetween will not properly occur, and thus the performance of the combined heat exchanger module is deteriorated.

In view of this, a plurality of relatively small thermoelectric elements 301 are connected in series to each other, so as to be compatible with various shapes of objects to be brought into surface contact with the thermoelectric elements 301, thereby reducing the cost of manufacturing the thermoelectric elements 301 and achieving perfect close contact between the thermoelectric elements 301 and objects to be brought into surface contact with the thermoelectric elements 301.

The thermoelectric elements 301 may be coupled to the second heat radiating channels 203 in such a manner that the lateral surfaces thereof, which come into surface contact with the second heat radiating channels 203, act as a cooling surface.

Referring to FIGS. 1 and 2, by virtue of the cooling surface, which is the lateral surface of each of the thermoelectric elements 301 that is in surface contact with the second heat radiating channels 203, the combined heat exchanger module according to the present invention can effectively achieve heating of the indoor air and cooling of the cooling water.

Hereinafter, a combined heat exchanger module according to various embodiments of the present invention will be described with reference to FIG. 4.

A combined heat exchanger module according to various embodiments of the present invention includes a first upper tank 102 into which cooling water is introduced, a lower tank 103 into which the cooling water is introduced or from which the cooling water is discharged, a second upper tank 104 from which the cooling water is discharged, first heat radiating channels 201, each having an upper end connected with the first upper tank 102 and a lower end connected with the lower tank 103, the first heat radiating channels 201 being formed to have a plate tube shape through which the cooling water flows and being arranged in planes which are parallel to the direction of air flow, second heat radiating channels 203, each having a lower end connected with the lower tank 103 and an upper end connected with the second upper tank 104, the second heat radiating channels 203 being formed to have a plate tube shape through which the cooling water flows and being arranged in planes which are parallel to the direction of the air flow and are disposed upstream or downstream of the first heat radiating channels 201 with respect to the direction of the air flow, and thermoelectric elements 301, each having one surface which is in surface contact with the second heat radiating channels 203 and the other surface exposed to the air.

Referring to FIG. 4, the combined heat exchanger module may be structured such that the cooling water is introduced and discharged into/from the respective first heat radiating channels 201 and second heat radiating channels 203 in a parallel manner, however, the combined heat exchanger module may be operated more efficiently in the case in which the cooling water is sequentially supplied in series to the first heat radiating channels 201 or the second heat radiating channels 203 depending on the temperature of the outdoor air or the temperature of the cooling water. FIG. 4 shows a series structure in which the cooling water is sequentially supplied in series to the first heat radiating channels 201 and the second heat radiating channels 203.

The parallel connection structure is used in the case in which the flow rate of the cooling water is relatively high, the temperature of the cooling water is relatively high, the flow rate of the cooling water through the first heat radiating channels 201 is higher than that through the second heat radiating channels 203, or the heat dissipation rate of the first heat radiating channels 201 is relatively high. The series connection structure is used in the case in which the flow rate of the cooling water is relatively low, the temperature of the cooling water is relatively low, or the heat dissipation rate of the first heat radiating channels 201 is similar to that of the second heat radiating channels 203. The flow rate of the cooling water through the first heat radiating channels 201 and the second heat radiating channels 203 may be determined by changing the volume or number of the channels.

Further, since the second heat radiating channels 203 are disposed upstream or downstream of the first heat radiating channels 201, it is possible to determine which of the first heat radiating channels 201 and the second heat radiating channels 203 the air to be supplied to the indoor space undergoes first heat exchange with.

As is apparent from the above description, the combined heat exchanger module according to the present invention has advantages of being able to perform the heating operation using both the cooling water and the thermoelectric elements and to bring the effect of cooling the cooling water using the thermoelectric elements.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A combined heat exchanger module comprising:
    an upper tank configured for introducing a cooling water into the combined heat exchanger module,
    a lower tank configured for discharging the cooling water from the combined heat exchanger module;
    first heat radiating channels, each having an upper end connected with the upper tank and a lower end connected with the lower tank, wherein each of the first heat radiating channels is formed with a flat tube shape through which the cooling water flows, and Wherein the first heat radiating channels are arranged in planes parallel to a direction of air flow;
    second heat radiating channels, each having an upper end connected with the upper tank and a lower end connected with the lower tank, Wherein each of the second heat radiating channels is formed with a flat tube shape through which the cooling water flows, wherein the second heat radiating channels are arranged in planes parallel to the direction of the air flow; and
    a plurality of thermoelectric elements, each having a first surface in surface contact with the second heat radiating channels and a second surface exposed to air,
    wherein the plurality of thermoelectric elements are arranged in series along a direction parallel to a straight line connecting the upper tank and the lower tank, and are connected to each other.

2. The combined heat exchanger module according to claim 1, further comprising:
    heat radiation fins coupled to at least one of the first heat radiating channels and the second surface of the thermoelectric elements,
    wherein the heat radiation fins are exposed to air.

3. The combined heat exchanger module according to claim 1, further comprising gaskets provided to seal connection portions between the upper and lower tanks and the first and second heat radiating channels.

4. The combined heat exchanger module according to claim 1, wherein the thermoelectric elements are coupled to both lateral surfaces of the second heat radiating channels by surface-contacting.

5. The combined heat exchanger module according to claim 1, wherein the first surface of each of the thermoelectric elements that is in surface contact with the second heat radiating channels acts as a cooling surface.

* * * * *